Jan. 3, 1933. J. C. KARNES 1,892,893
OPTICAL SYSTEM
Filed April 25, 1928

Inventor
James C. Karnes
By W. N. Roach
Attorney

Patented Jan. 3, 1933

1,892,893

UNITED STATES PATENT OFFICE

JAMES C. KARNES, OF BUFFALO, NEW YORK

OPTICAL SYSTEM

Application filed April 25, 1928. Serial No. 272,773.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes without the payment to me of any royalty thereon.

This invention relates to an optical system.

In optical systems only about 50% of the light which enters the objective is transmitted and the system is therefore made of sufficient size to give clear vision and maximum utility in darkness and fog. The customary practice in forming an optical system is to have all of the prisms of the same size, the edges of the prisms being beveled or rounded to prevent chipping of the glass.

For a considerable time there has been a demand for a binocular telescope whose weight will be much less than that of the standard instrument. The attempt to meet the condition by means of smaller objectives has not met with approval by reason of the diminished visibility due to loss of light gathering power.

According to the present invention I reduce the size and consequently the weight of the instrument by making all elements of the optical system to conform in size and shape to the cone of usable light rays. The dimensioning of the optical elements will be on the basis of a cone established between the entrant and emergent areas of the system.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein.

Figure 1:
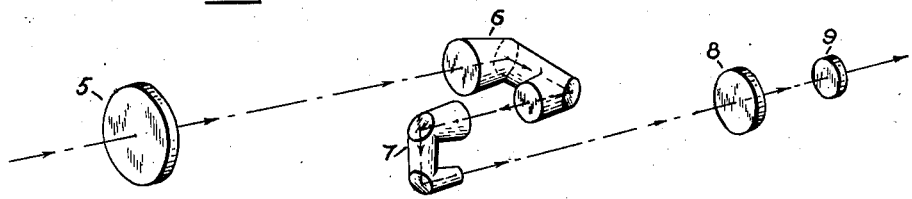
Fig. 1 is a perspective view of an optical system formed in accordance with the invention.
Figure 2:
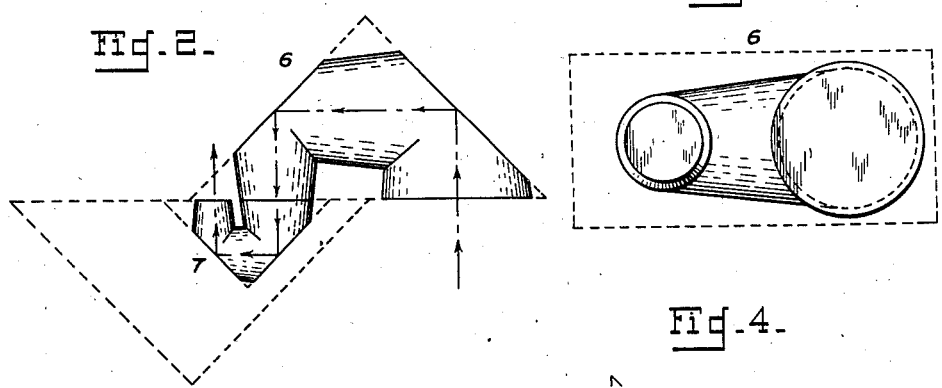
Fig. 2 is a plan view of the prisms of Fig. 1.
Figure 3:
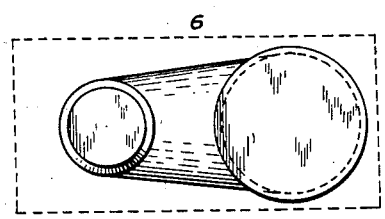
Fig. 3 is a face view of one of the prisms.

Referring to the drawing by numerals of reference:

The invention is illustrated in connection with a standard prism binocular whose optical system comprises an objective 5 and an erecting system consisting of a pair of total reflecting prisms 6 and 7, a field lens 8 and an eye lens 9. The basis of forming the individual prisms 6 and 7 of the erecting system is the cone of usable light rays established between the objective 5 and the field lens 8 and the diameter of any particular portion of the prism will be dependent on its relative position in the focal length of the optical system. In this way the cross sectional area at any point in the prism system will be no more and no less than that required to accommodate the light transmission at that point. For this reason the reflecting prism 7 is much smaller than the objective prism 6 and the latter is approximately one-half the weight of a corresponding right angle prism indicated in dotted lines in Figs. 2 and 3. Furthermore the length of the path through the prisms 6 and 7 is considerably reduced over the path in the normal erecting system indicated in dotted lines and therefore results in less loss of light. This reduction in the size and weight of the prisms with a complementary reduction in the casing (not shown) produces an instrument which meets the limitation of minimum weight.

Figure 4:
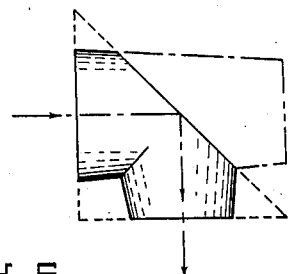
Figs. 4 and 5 are plan views of different types of prisms.
Figure 5:
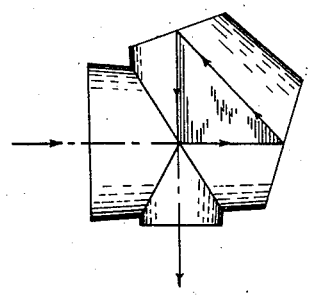
Figure 6:
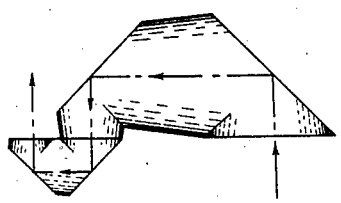
Fig. 6 is a view similar to Fig. 2 showing a manner of further reducing the amount of glass in the prism.

In Fig. 4 the invention is illustrated in a single reflecting prism and in Fig. 5 in a multiple reflecting penta prism.

When using the improved prism in a telescope it will not be necessary to employ diaphragms for the purpose of preventing stray light from entering the eye of the user.

I claim:

1. An optical system for the transmission of an image consisting of a plurality of total reflecting prisms, each prism shaped to conform in cross-sectional area with the cone of usable light rays at all complementary points in the focal length of the system.

2. An optical system for the transmission of an image including a plurality of total reflecting optical elements each of which is shaped to conform in cross-sectional area with the cone of usable light rays passing through its position in the system.

3. A total reflecting prism having the form of a cone established between the image receiving and image emerging areas, all cross-section areas of the prism conforming to the like cross-sectional areas of the cone of light rays passing through the prism.

4. A total reflecting prism having an entrant and an emergent face, the area of the cross-section at any point along the focal axis between the faces conforming to the cross-sectional area at the same point of the usable portion of light rays being transmitted through the prism.

5. A total reflecting prism shaped to conform in cross-sectional area with the conical path of light rays transmitted through the prism.

6. A total reflecting prism having a circular entrant and a circular emergent face, the diameter of the two faces being of different values, and all cross-sectional areas of the prism between the faces being of the same value as the corresponding cross-sectional areas of the bundle of transmitted image rays.

7. An optical system for the transmission of an image consisting of a plurality of Porro-type total reflecting prisms, the length of the optical axis of one of said prisms being substantially one-half the length of the optical axis of the other prism.

8. An optical system for the transmission of an image consisting of a plurality of Porro-type total reflecting prisms, the length of the optical axis of one of said prisms being less than one-half the length of the optical axis of the other prism.

9. An optical system for the transmission of an image consisting of a plurality of Porro-type total reflecting prisms, the parallel displacement of the optical axis of one prism being less than one-half of the parallel displacement of the optical axis of the other prism.

10. An optical system for the transmission of an image consisting of a plurality of similar type total reflecting prisms, the parallel displacement of the optical axis of one prism being substantially less than one-half the parallel displacement of the optical axis of the other prism.

11. In a telescope, an objective, a lens spaced therefrom, and establishing therewith a cone of usable light rays, and a total reflecting prism between the objective and lens and conforming in all cross-sectional areas with the corresponding cross-sectional areas of the cone of usable rays.

JAMES C. KARNES.